(12) United States Patent
Tsujimoto

(10) Patent No.: US 10,762,275 B2
(45) Date of Patent: Sep. 1, 2020

(54) INFORMATION PROCESSING APPARATUS, METHOD, AND STORAGE MEDIUM

(71) Applicant: CANON KABUSHIKI KAISHA, Tokyo (JP)

(72) Inventor: Koichi Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 16/284,983

(22) Filed: Feb. 25, 2019

(65) Prior Publication Data

US 2019/0266221 A1 Aug. 29, 2019

(30) Foreign Application Priority Data

Feb. 28, 2018 (JP) ................. 2018-035318

(51) Int. Cl.
*G06F 17/00* (2019.01)
*G06F 40/106* (2020.01)
*G06F 9/451* (2018.01)
*G06F 40/166* (2020.01)
*G06F 40/186* (2020.01)

(52) U.S. Cl.
CPC ............ *G06F 40/106* (2020.01); *G06F 9/452* (2018.02); *G06F 40/166* (2020.01); *G06F 40/186* (2020.01)

(58) Field of Classification Search
CPC ..... G06F 40/106; G06F 40/166; G06F 40/186; G06F 9/452
USPC .......................................................... 715/234
See application file for complete search history.

(56) References Cited

U.S. PATENT DOCUMENTS

| 7,383,498 | B1* | 6/2008 | Hickl ................... | G06F 40/154 715/235 |
| 7,698,631 | B1* | 4/2010 | Toebes .................. | G06F 40/14 715/234 |
| 9,348,803 | B2* | 5/2016 | Vagell ................... | G06F 40/106 |
| 2005/0050021 | A1* | 3/2005 | Timmons .............. | G06F 16/957 |
| 2008/0178073 | A1* | 7/2008 | Gao ....................... | G06F 40/103 715/243 |

FOREIGN PATENT DOCUMENTS

JP 2004-259129 A 9/2004

* cited by examiner

*Primary Examiner* — Scott T Baderman
*Assistant Examiner* — Hassan Mrabi
(74) *Attorney, Agent, or Firm* — Canon U.S.A., Inc., IP Division

(57) ABSTRACT

In a case where a form ID and preview is designated in an operation name, a parameter for enabling direct preview is added to a redirect uniform resource locator (URL), and a generated document is displayed in a form service window by skipping display of each screen.

10 Claims, 16 Drawing Sheets

FIG.5

| \multicolumn{2}{c}{DOCUMENT GENERATION REQUEST BUTTON SETTING} | |
|---|---|---|
| SCREEN NAME | WORK SCREEN | ~502 |
| DISPLAY NAME | DOCUMENT GENERATION | ~503 |
| PARAMETERS | DOCUMENT GENERATION SERVER URI | ~504 |
| | srv_url=[CPSURL] | ~505 |
| | formdocid=[FORM ID] | ~506 |
| | operation=[OPERATION NAME] | ~507 |
| | recordid=[ATTACH DESTINATION ID] | ~508 |
| | selectkey=[FORM SELECTION KEYWORD] | ~509 |
| | query=[QUERY VARIABLE] | ~510 |
| | docname=[DOCUMENT NAME] | ~511 |
| | sync=[DIRECT PREVIEW] | ~512 |

501

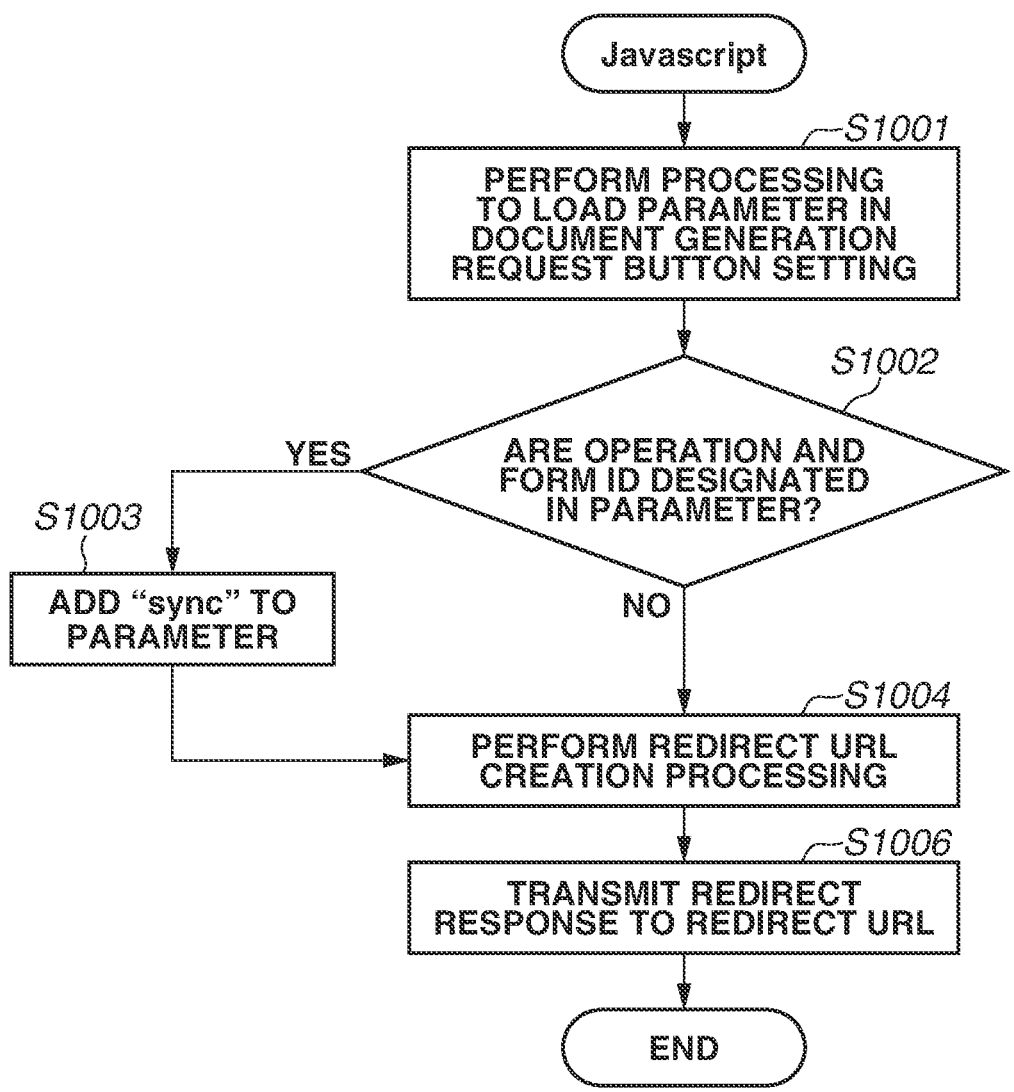

FIG.11A

WORK SCREEN — 400

| PRODUCT NAME | CD |
|---|---|
| QUANTITY | 1 |
| PRICE | 2,000 |

[DOCUMENT GENERATION] — 401

FIG.11B

FORM SELECTION SCREEN — 420

QUOTATION
DELIVERY NOTE — 421

[DOCUMENT GENERATION] — 422

FIG.11C

DOCUMENT OPERATION SCREEN — 430

[PREVIEW] — 431

[STORE DOCUMENT IN CLOUD PLATFORM SERVER]

FIG.11D

PREVIEW SCREEN — 440

QUOTATION
Mr./Ms. XXX

| PRODUCT NAME | QUANTITY | PRICE |
|---|---|---|
| CD | 1 | 2,000 |
| | TOTAL ¥2,000 | |

FIG.11E

ATTACH COMPLETE SCREEN — 1201

ATTACH COMPLETE

DOCUMENT NAME:
QUOTATION

ATTACH DESTINATION URL:
http://xxx/xxx

[PREVIEW] — 1202

INFORMATION PROCESSING APPARATUS, METHOD, AND STORAGE MEDIUM

BACKGROUND OF THE INVENTION

Field of the Invention

The present invention relates to an information processing apparatus, a method, and a program for a system that generates a document based on data stored in a cloud service.

Description of the Related Art

Recently, a cloud computing system has been widely used as a way to manage work data and perform various processes on a server computer. A user accesses a web page on a cloud server computer from a browser of a client computer via the Internet, and work data to be browsed is displayed on the web page.

The following technique has been heretofore known (see Japanese Patent Application Laid-Open No. 2004-259129). That is, a user presses a button provided on a work screen to return a redirect instruction to a browser in response to a transmitted document generation request, and the browser is caused to access a document generation screen. After that, a generated document is displayed in a viewer that is different from the document generation screen.

SUMMARY OF THE INVENTION

According to an aspect of the present disclosure, an information processing apparatus includes a web browser configured to communicate with a system including a cloud platform server, a document generation server, and a storage server. The web browser configured to display a screen based on data transmitted from the system includes a display configured to display a first window, a second window, and a third window, the first window being configured to display a work screen to receive an instruction to generate a document, the second window being configured to display a document operation screen to receive an instruction to perform an operation on the document generated in response to the instruction to generate the document, the third window being configured to display the document to be previewed in response to the instruction to perform the operation. In a case where preview is designated as a document operation name in HyperText Markup Language (HTML) on the work screen, the display displays the document in the second window without opening the third window.

Further features of the present disclosure will become apparent from the following description of exemplary embodiments with reference to the attached drawings.

BRIEF DESCRIPTION OF THE DRAWINGS

FIG. 5 illustrates an example of definition information about a document generation request button held in the cloud platform server according to the first exemplary embodiment.

FIG. 9 is a flowchart illustrating redirect uniform resource locator (URL) creation processing in the cloud platform server according to the first exemplary embodiment.

FIGS. 11A to 11E illustrate screen examples of a cloud platform server and the document generation server according to the second exemplary embodiment.

DESCRIPTION OF THE EMBODIMENTS

When a web browser is redirected to a document generation server, a form used for a request parameter is designated and preview is designated as an operation, to thereby make it possible to omit a user operation on a form selection screen and a document operation screen.

Modes for carrying out the present disclosure will be described below with reference to the drawings.

Figure 1:
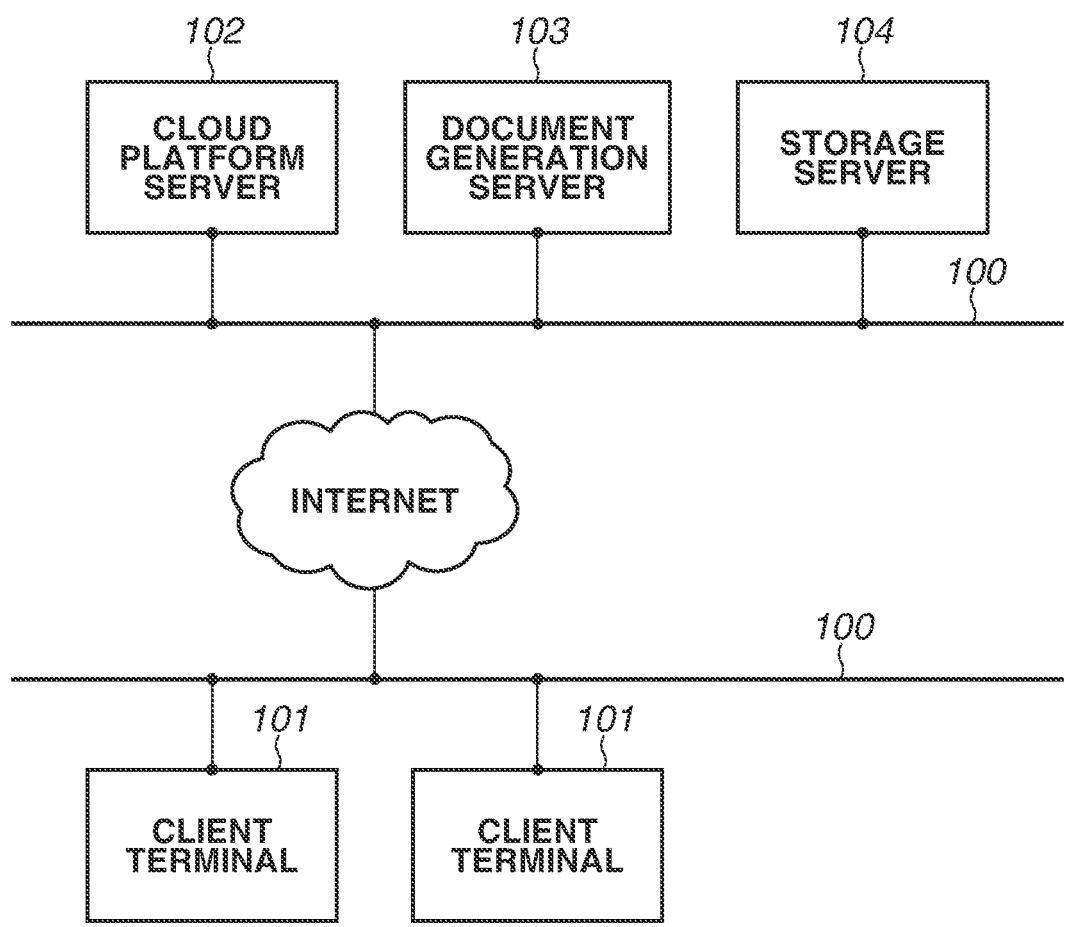
FIG. 1 is a block diagram illustrating a system configuration according to a first exemplary embodiment of the present disclosure.

FIG. 1 is a block diagram illustrating a system configuration according to a first exemplary embodiment of the present disclosure. Each of client terminals 101 illustrated in FIG. 1 issues a request to a cloud platform server 102, a document generation server 103, and a storage server 104, which are described below. Each of the cloud platform server 102, the document generation server 103, and the storage server 104 is an information processing apparatus.

The cloud platform server 102 illustrated in FIG. 1 performs display control, update processing, and the like on held data in response to a request from each client terminal 101 or the document generation server 103. The cloud platform server 102 manages users who use the cloud platform server 102, and also manages work data and a setting for causing a redirect to the document generation server 103 as described below. It is assumed that the cloud platform server 102 is used by a plurality of companies or organizations (generally referred to as a multi-tenant). The management of users, the management of work data, and the like are carried out for each company or organization that uses the cloud platform server 102.

The document generation server 103 illustrated in FIG. 1 receives a request from each client terminal 101 and returns user interface information. Further, the document generation server 103 receives a request from each client terminal 101, acquires work data from the cloud platform server 102, and performs overlaying processing using forms managed by the document generation server 103 together with the work data, thereby generating a document.

The storage server 104 illustrated in FIG. 1 receives a request from the document generation server 103, and stores and manages generated document data. The above-described components are communicably connected to each other via a network 100. The network 100 is, for example, a local area network (LAN) such as the Internet, a wide area network (WAN), a phone line, a dedicated digital line, an asynchronous transfer mode (ATM) or frame relay line, a cable television line, or a data broadcasting wireless line, or a communication network implemented by a combination thereof. Any network may be used as the network 100, as long as data can be transmitted and received via the network. Different communication methods may be used for communication from each client terminal 101 to the cloud platform server 102 and the document generation server 103, communication from the document generation server 103 to the cloud platform server 102, and communication between servers.

Figure 2:
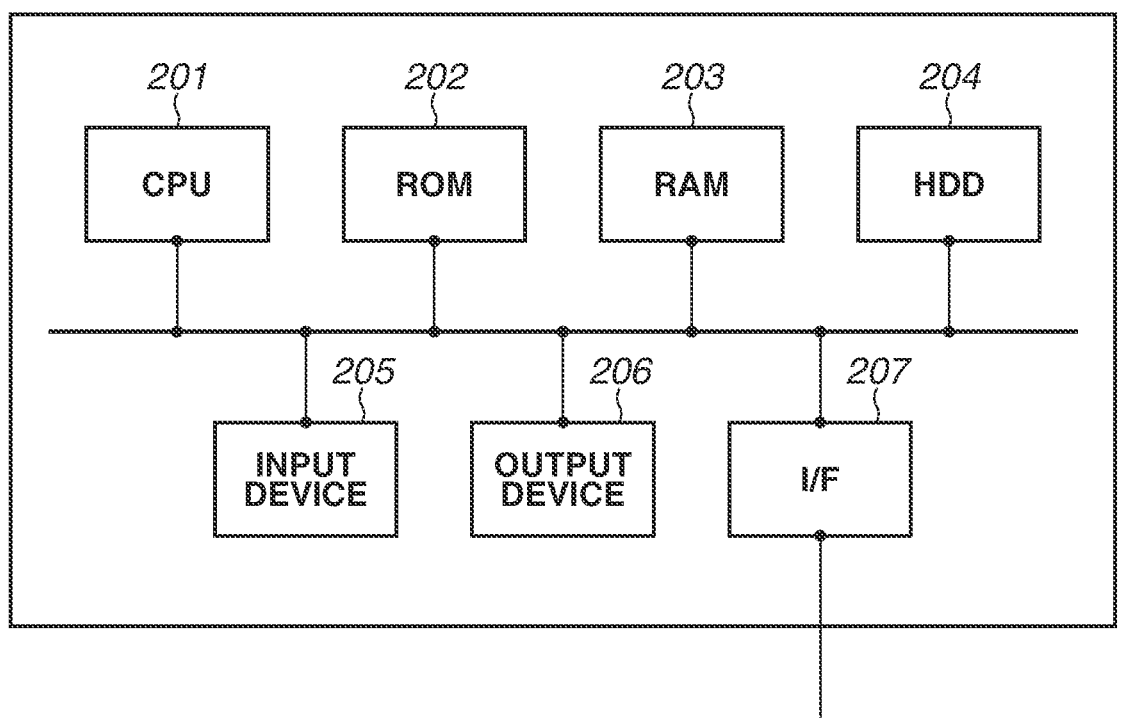
FIG. 2 is a block diagram illustrating a hardware configuration according to the first exemplary embodiment.

FIG. 2 is a block diagram illustrating a hardware configuration of each of the client terminals 101, the cloud platform server 102, the document generation server 103, and the storage server 104 illustrated in FIG. 1. A central processing unit (CPU) 201 illustrated in FIG. 2 directly or indirectly controls devices (a read-only memory (ROM), a random access memory (RAM), and the like to be described below) which are connected via an internal bus, and executes a program for implementing the present disclosure. A ROM 202 stores a basic input/output system (BIOS). A RAM (main storage device) 203 is used as a work area for the CPU 201, or is used as a temporary storage for loading software modules for implementing the present disclosure. An indirect storage device 204 is, for example, a hard disk drive (HDD) or a solid state drive (SSD), which stores an operating system (OS), which is basic software, and software modules.

An input device 205 is, for example, a keyboard or a pointing device (not illustrated). An output device 206 is connected to a display. An interface (I/F) 207 is used to connect to the network 100. In these pieces of hardware, after start-up, the CPU 201 executes the BIOS and loads the OS from the HDD 204 into the RAM 203 so that the OS can be executed. In accordance with the operation of the OS, the CPU 201 loads various software modules, which are described below, from the HDD 204 into the RAM 203 as needed so that the software modules can be executed. The various software modules are executed by the CPU 201 to operate in cooperation with the above-described devices. The I/F 207 is connected to the network 100 and is controlled by the CPU 201 in accordance with the operation of the OS to implement communications by a communication means as described above.

Figure 3:
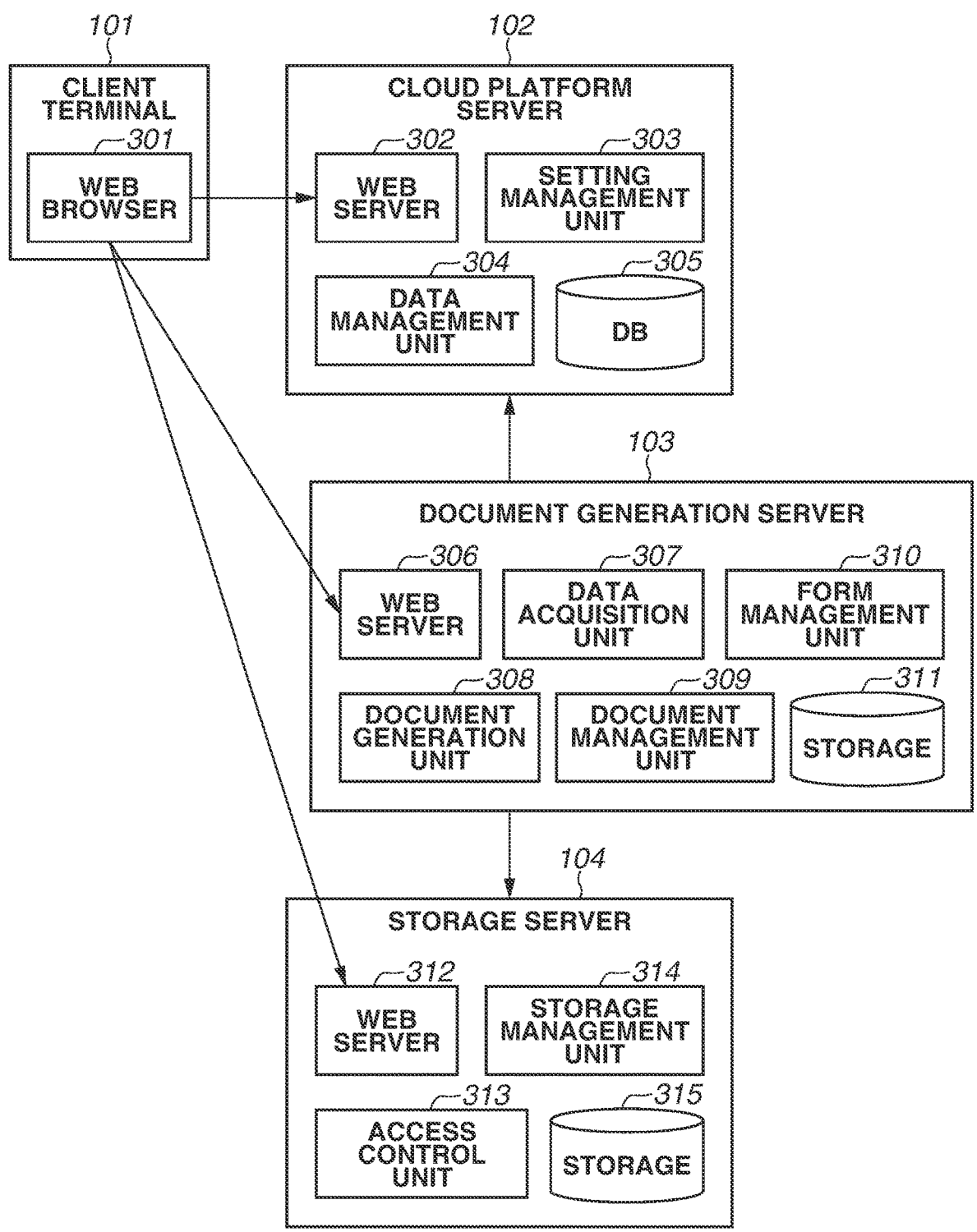
FIG. 3 is a configuration diagram illustrating software modules in a document generation server according to the first exemplary embodiment.

FIG. 3 is a configuration diagram illustrating software modules in the document generation server 103 according to the first exemplary embodiment of the present disclosure. The software modules are stored in the HDD 204 illustrated in FIG. 2. The software modules are loaded into the RAM 203 and executed by the CPU 201 as described above, thereby implementing their functions. Accordingly, each of the software modules illustrated in FIG. 3 that are implemented by hardware executes processing according to the present disclosure. Referring to FIG. 3, the client terminal 101 includes a web browser 301 as a user interface application. The web browser 301 receives a browser window control program in the form of JavaScript® from each of a web server 302, a web server 306, and a web server 312. The web browser 301 which has executed the window control program controls display of a screen and controls access to a server in accordance with an instruction from the window control program.

Referring to FIG. 3, the cloud platform server 102 includes the web server 302, a setting management unit 303, a data management unit 304, and a database (DB) 305. The web server 302 returns user interface information including the window control program in response to a request from the web browser 301. The web browser 301 executes rendering processing based on the user interface information obtained from the web server 302 to display a screen. The data management unit 304 holds work data in the DB 305, and acquires the work data from the DB 305, or updates the work data, in response to a request. The setting management unit 303 holds a setting for redirecting to document generation server 103. The cloud platform server 102 executes processing as described below in cooperation with the components described above.

The DB 305 stores management user data, work data, and a setting for redirecting to the document generation server 103. The work data and the setting for causing a redirect to the document generation server 103, which are stored in the DB 305, are updated by a user at an arbitrary timing via the web browser 301.

Referring to FIG. 3, the document generation server 103 includes the web server 306, a data acquisition unit 307, a document generation unit 308, a document management unit 309, a form management unit 310, and a storage 311.

The web server 306 includes a web application function, which enables the client terminal 101 to access the web server 306 via the web browser 301. The web server 306 returns user interface information in response to a request. The web browser 301 performs rendering processing on the user interface information obtained from the web server 306 and displays the user interface information. The displayed user interface information includes, for example, user interface information for requesting the document generation server 103 to generate a document and acquire a uniform resource locator (URL) for generated document data, and browser window control information.

The data acquisition unit 307 receives a document generation request from the web browser 301, and acquires work data from the cloud platform server 102. The document generation unit 308 performs overlaying processing using a form together with the work data to generate document data. The document management unit 309 transmits the document data generated by the document generation unit 308 to the storage server 104. The function of generating and providing document data is referred to as a form service. Further, the document management unit 309 receives a document data URL acquisition request via the web server 306, and issues a temporary URL that enables access to the document data stored in the storage server 104.

The form management unit 310 manages form data, which is used for overlaying processing to generate a document, in the storage 311. The storage 311 is a DB that stores forms, and is stored in the HDD 204 illustrated in FIG. 2. The document generation server 103 has a configuration as described above.

The storage server 104 includes the web server 312, an access control unit 313, a storage management unit 314, and a storage 315. The web server 312 includes a web application function, which enables the client terminal 101 to access the web server 312 through the web browser 301. The access control unit 313 manages temporary URL access control information, and determines whether to permit execution of the request received by the web server 312 based on the temporary URL access control information. The request, the execution of which is permitted by the access control unit 313, is delivered to the storage management unit 314. The request, the execution of which is determined not to be permitted, is processed as an error. The storage management unit 314 manages file information, and inputs or outputs a file for which an upload/download request has been issued. The storage 315 stores the file received by the storage server 104.

Figure 4:
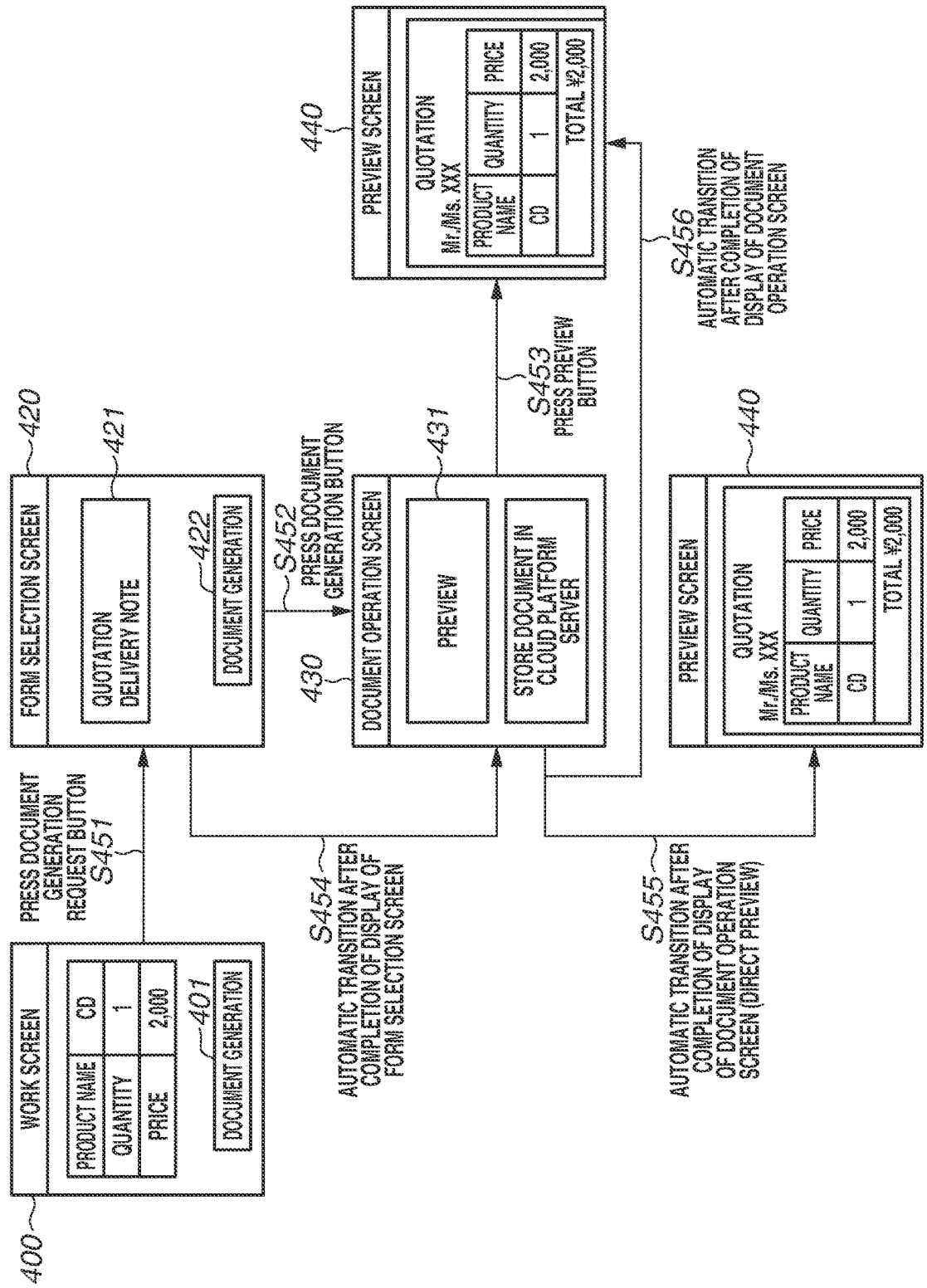
FIG. 4 illustrates examples of screens provided by a cloud platform server and a document generation server and a screen transition flow according to the first exemplary embodiment.

FIG. 4 illustrates examples of screens provided by the cloud platform server 102 and the document generation server 103 and a screen transition flow. A work screen 400 is an example of a work screen to be displayed when the cloud platform server 102 is accessed from the web browser 301 and work data is displayed based on the user interface information acquired from the web server 302. On the work screen 400, record information stored in the DB 305 of a certain cloud platform server 102 is displayed, and a document generation request button 401 that is set to cause a redirect to the document generation server 103 is also displayed. The document generation request button 401 is a button for instructing generation of a document. The document generation request button 401 can be arbitrarily set. For example, an operation to be performed when the document generation request button 401 is pressed, and a screen on which the document generation request button 401 is displayed can be arbitrarily set. The document generation request button 401 is arranged on the screen by the user. A window of a web browser for displaying the work screen 400 is referred to as a cloud platform service window. This window displays a screen illustrated on the left side of FIG. 4.

Screens 420, 430, and 440 are examples of a screen for displaying user interface information to be acquired as a result of redirecting the web browser 301, which has received a redirect URL from the cloud platform server 102, to the document generation server 103. A window of a web browser for displaying each of the screens is referred to as a form service window. This window displays three screens located in the middle of FIG. 4. The document operation screen 430 and the preview screen 440 are not initially displayed on the web browser 301, and when the user performs an operation on the web browser 301, the document operation screen 430 and the preview screen 440 are displayed on the web browser 301. Referring to FIG. 4, the screens are displayed separately for each row so as to identify which screen is displayed in which window. For example, the work screen 400 and the form selection screen 420 are displayed in different display windows. This is because the cloud platform server 102 and the document generation server 103 are servers that are located in different domains, and thus different display windows are used to enable the user to recognize that the cloud platform server 102 and the document generation server 103 are located in different domains.

In step S451, the user presses the document generation request button 401 to redirect the web browser 301 to the document generation server 103. As a result, the web browser 301 displays the form selection screen 420 based on the user interface information acquired from the web server 306. The form selection screen 420 includes a form selection 421 to select a form to be used for generating a document. The web browser 301 which has received the designation of form selection in a selection instruction from the user using a document generation button 422 transmits the selection result of the form selection 421 to the document generation server 103, acquires the user interface information from the web server 306, and displays the document operation screen 430 (S452).

If a form identification (ID) 506 is designated in the redirect URL received in step S451, the web browser 301 transmits the form ID 506 to the document generation server 103 simultaneously with completion of the display of the form selection screen 420, acquires the user interface information from the web server 306, and displays the document operation screen 430 (S454).

The document operation screen 430 includes a document operation button 431 for selecting an operation to be performed on the generated document data. The web browser 301 which has received the designation of a document operation name in an instruction issued by the user by pressing the document operation button 431 (S453) transmits a request for performing the selected operation to the document generation server 103. Upon receiving the designation of the document operation name as a URL parameter, the web browser 301 transmits, to the document generation server 103, a request for performing the selected operation simultaneously with completion of the display of the document operation screen 430 (S456). Although three windows are provided as described above, if a document operation name is preliminarily designated in a URL, a document preview operation is performed using two windows.

In the first exemplary embodiment, the web browser 301 performs the following processing because preview is selected in the designation of a document operation name. The web browser 301 creates a pop-up window for displaying the preview screen 440. The pop-up window is displayed in another window or another tab of the web browser 301, as indicated by the window located on the right side of FIG. 4. A document data acquisition request is transmitted to the document generation server 103, and a document data URL in the storage server 104 storing the document data is acquired. Next, the document data acquisition request is transmitted to the storage server 104 to display a preview of the document data in the created pop-up window.

If a direct preview 512 is designated as a URL parameter, the web browser 301 displays the preview screen 440 in the window of the document operation screen 430 (S455) without creating a pop-up window. A pop-up window is not displayed in steps S453 and S456. This is because if the document operation screen 430 remains open as a window on the web browser even after the user who is supposed to check the preview screen 440 has designated a document operation name in advance, the display of the screen may annoy the user. In the manner as described above, a preview of the document data is displayed on the web browser 301.

FIG. 5 illustrates an example of definition information about the document generation request button 401 held in the setting management unit 303 of the cloud platform server 102. Referring to FIG. 5, the document generation request button 401 is defined in HyperText Markup Language (HTML) on the work screen 400. As setting information about the document generation request button 401, a screen name 502 of a screen for displaying the document generation request button 401, a button display name 503, and parameter information used for causing a redirect to the document generation server 103 are stored. The web browser 301 controls display of a screen and controls access to a server by referring to parameter information illustrated in FIG. 5 based on the window control program.

A document generation server uniform resource identifier (URI) 504 is a parameter that represents a URI for the document generation server 103 and is designated in the form of "http://~". A cloud platform server (CPS) URL 505 is a setting for adding, to the URL parameter, a URL that enables the document generation server 103 to access the cloud platform server 102 as a character string "srv_URL=<cloud platform service URL>".

The form ID 506 is a setting for adding, to the URL parameter, an ID character string "formdocid=<form ID>" for designating a form used to overlay the work data acquired by the document generation server 103 to generate document data. The designation of the form ID 506 in a URL enables the user who operates the web browser 301 to skip the form selection designation processing on the form selection screen 420.

An operation name 507 is a setting for adding, to the URL parameter, a character string "operation=<operation name>" for designating an operation to be performed on the document data generated by the document generation server 103. Examples of the operation include a preview operation to display a document on the web browser 301, and an attach operation to upload document data to the cloud platform server 102. The designation of an operation name in a URL enables the user who operates the web browser 301 to skip the document operation name designation processing on the document operation screen 430.

An attach destination ID 508 is a setting for adding, to the URL parameter, a character string "recordid=<attach destination ID>" for designating an attach destination ID when the document data generated by the document generation server 103 is uploaded to the cloud platform server 102. A form selection keyword 509 is a setting for adding, to the URL parameter, a character string "selectkey=<form selection keyword>" for designating a form selection keyword used to narrow down forms to be displayed in the form selection 421 within the form selection screen 420. A query variable 510 is a setting for adding, to the URL parameter, a variable defined in a query command 605 used for the data acquisition unit 307 to acquire work data from the cloud platform server 102 as "query=<query variable>".

A document name 511 is a setting for adding, to the URL parameter, a character string "docname=<document name>" for designating a document name when the document generation server 103 generates document data. The direct preview 512 is a setting for adding, to the URL parameter, a character string "sync=<direct preview>" for designating a document operation screen window as a window for displaying the document data. Only values indicating "true" are valid. If a value indicating "false" or other character strings are designated, the preview screen 440 is displayed in a pop-up window, like in a case where the direct preview 512 is not designated.

Figure 6:
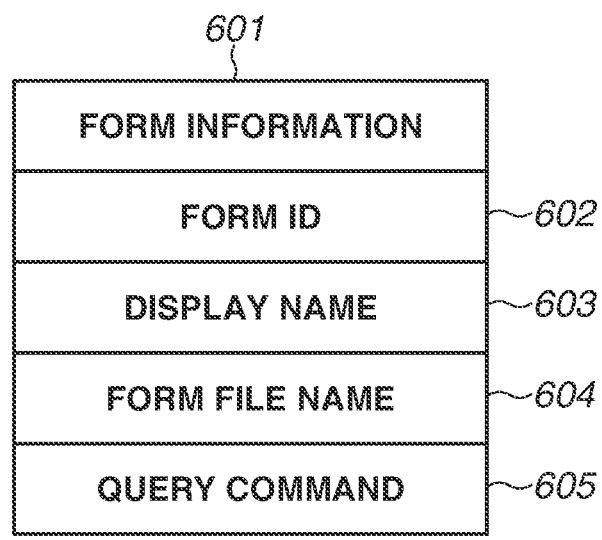
FIG. 6 illustrates an example of a form information table structure held in the document generation server according to the first exemplary embodiment.

FIG. 6 illustrates an example of a table structure of a form information table held in the form management unit 310 of the document generation server 103. A form information record in a form information table 601 includes a form ID 602, a display name 603, a form file name 604, and the query command 605. The form ID 602 uniquely identifies a form. The display name 603 is a name to be displayed on the form selection screen 420. The form file name 604 is a file name of a form managed by the form management unit 310 of the document generation server 103. The query command 605 is a command in which a query for acquiring work data from the cloud platform server 102 is described.

Figure 7:
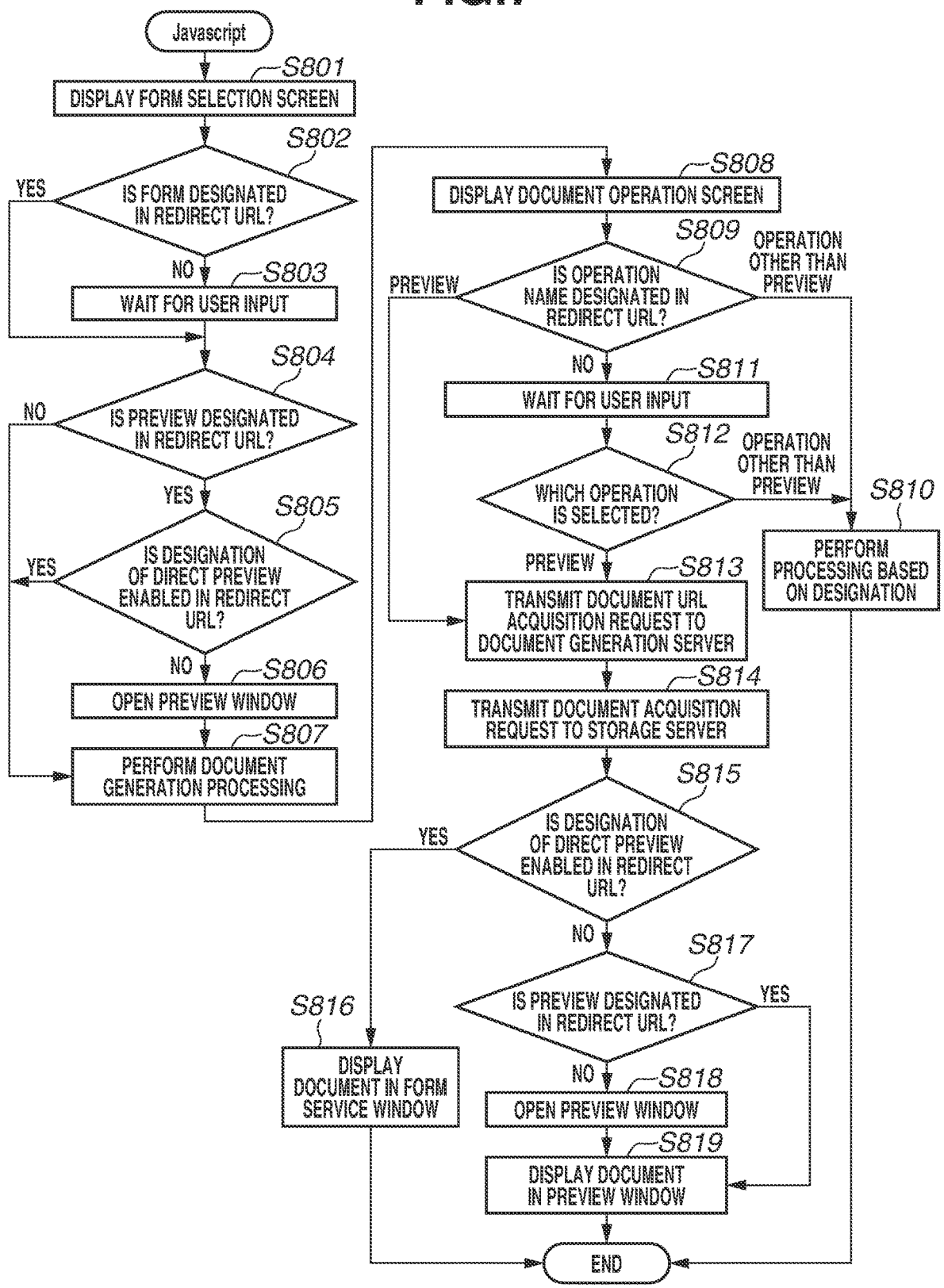
FIG. 7 is a flowchart illustrating document generation processing and document display processing in a web server 302 according to the first exemplary embodiment.

FIG. 7 is a flowchart illustrating document generation processing and document display processing in the web browser 301. The web browser 301 executes the window control program in the form of JavaScript® to start processing. First, in step S801, the web browser 301 displays the form selection screen 420. Next, in step S802, the web browser 301 checks whether the form ID 506 is included in the redirect URL. If the form ID 506 is included in the redirect URL (YES in step S802), the form designation processing in the form selection 421 is completed, and thus the processing automatically proceeds to step S804 immediately after completion of the display of the form selection screen 420.

If the form ID 506 is not included in the redirect URL (NO in step S802), the processing proceeds to step S803. In step S803, the web browser 301 waits for a user input. In step S804, the web browser 301 checks whether a character string "preview" for designating a preview operation is included in the operation name 507 of the redirect URL. If the character string "preview" is included in the redirect URL (YES in step S804), the processing proceeds to step S805. In step S805, the web browser 301 checks whether the preview operation is designated in the operation name 507 of the redirect URL, checks whether the form ID 506 is designated, and checks whether "true" is designated in the direct preview 512, thereby checking whether the designation of the direct preview 512 is enabled. Since there is no need to open a new window when the designation of the direct preview 512 is enabled (YES in step S805), the processing proceeds to step S807. If the designation of the direct preview 512 is disabled (NO in step S805), the processing proceeds to step S806. In step S806, the web browser 301 creates an empty pop-up window for preview.

In step S807, the web browser 301 transmits the document generation request including the form ID 506 to the document generation server 103, and displays the document operation screen 430 based on the acquired user interface information in step S808. Next, in step S809, the web browser 301 checks whether a preview operation is designated in the operation name 507 in the redirect URL.

If the preview operation is designated in the operation name 507, the operation designation processing using the document operation button 431 is completed, and thus the processing automatically proceeds to step S813 immediately after completion of the display of the document operation screen 430. In step S813, the web browser 301 transmits the document generation request to the document generation server 103. Next, the document data acquisition request is transmitted to the document generation server 103, and the document data URL in the storage server 104 storing the document data is acquired. Then, in step S814, the web browser 301 transmits the document data acquisition request to the storage server 104 to display the preview of the document data in the created pop-up window.

Next, in step S815, the web browser 301 checks whether the preview operation is designated in the operation name 507 of the redirect URL, checks whether the form ID 506 is designated, and checks whether "true" is designated in the direct preview 512, thereby checking whether the designation of the direct preview 512 is enabled. If the designation of the direct preview 512 in the URL parameter is enabled (YES in step S815), the processing proceeds to step S816. In step S816, the web browser 301 displays the preview screen 440 in the window of the document operation screen 430 without creating a pop-up window.

If the direct preview 512 is not designated in the URL parameter (NO in step S815), the processing proceeds to step S817. In step S817, the web browser 301 checks whether the character string "preview" for designating the preview operation is included in the operation name 507 of the redirect URL. If the character string is included in the redirect URL (YES in step S817), the processing proceeds to step S819. In step S819, the preview screen 440 is displayed in a pop-up window because a preview window is already opened. If the character string is not included in in the redirect URL (NO in step S817), the processing proceeds to step S818. In step S818, the web browser 301 creates an empty pop-up window for preview, and then, in step S819, the web browser 301 displays the preview screen 440 in the pop-up window. In step S809, the web browser 301 checks whether the operation name 507 is designated in the redirect URL. If the operation name 507 itself is not designated (NO in step S809), the processing proceeds to step S811. In step S811, the web browser 301 waits for the user to press the document operation button 431. In step S809, if the operation name 507 is designated in the redirect URL and an operation other than the preview operation, such as an operation of storing a document in the cloud platform server 102, is designated, the processing proceeds to step S810. In step S810, processing based on the designated operation is executed. An example of the processing to be executed based on the designated operation in step S810 is processing for transmitting a document to the cloud platform server 102 and storing the document into the cloud platform server 102.

In step S811, when the user presses the document operation button 431, the web browser 301 checks the selected operation in step S812. If an operation other than the preview operation is selected, the processing proceeds to step S810. If the preview operation is selected, the processing proceeds to step S813. In step S813, the web browser 301 transmits a document URL acquisition request to the document generation server 103. Details of the processing are the same as those described above, and thus descriptions thereof are omitted. By the processing described above, the web browser 301 executes document generation processing and document display processing.

Figure 8:
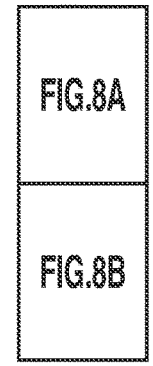
FIG. 8 includes
Figure 8A:
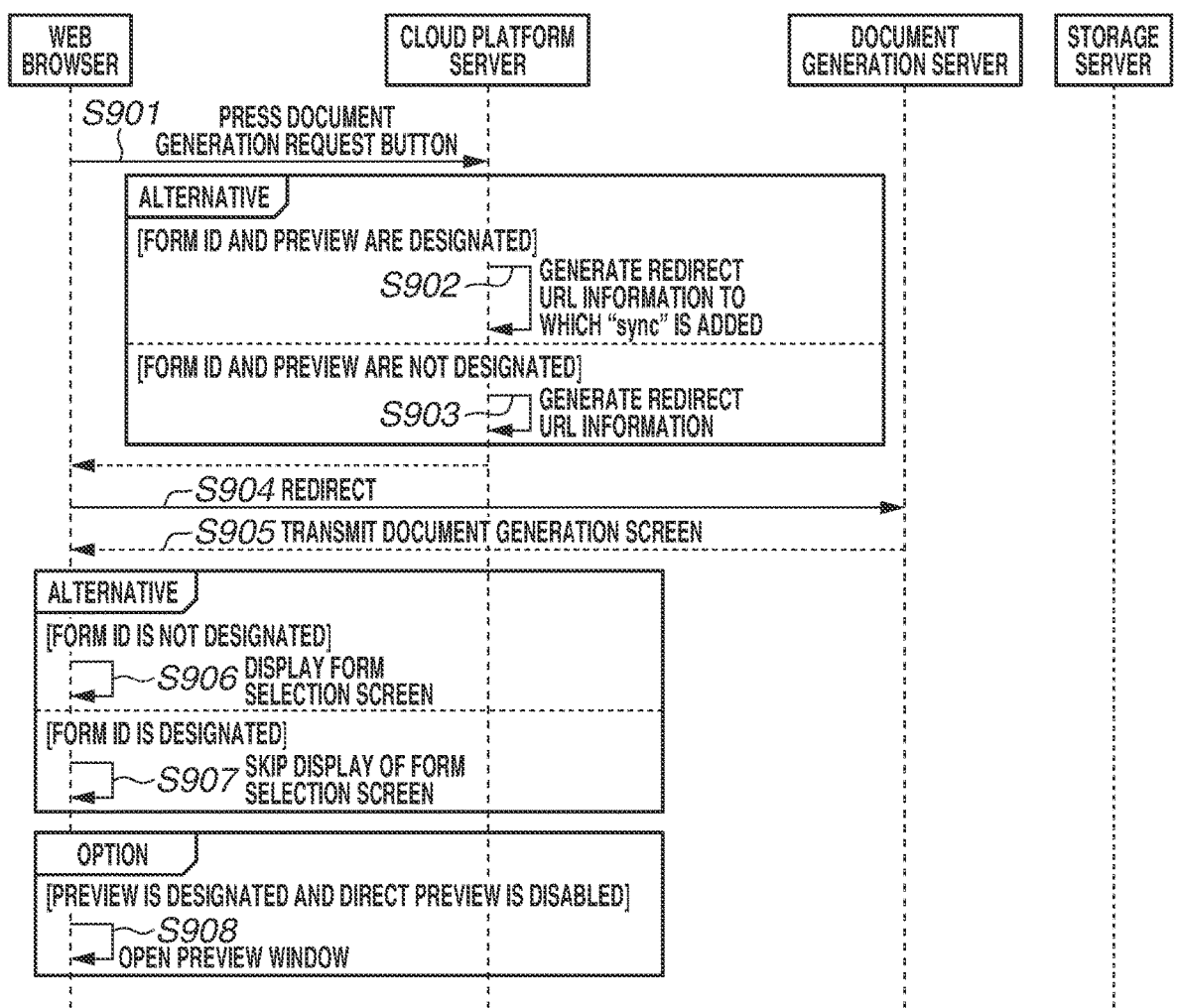
FIGS. 8A and 8B are sequence diagrams illustrating document generation processing and document display processing in the cloud platform server according to the first exemplary embodiment.
Figure 8B:
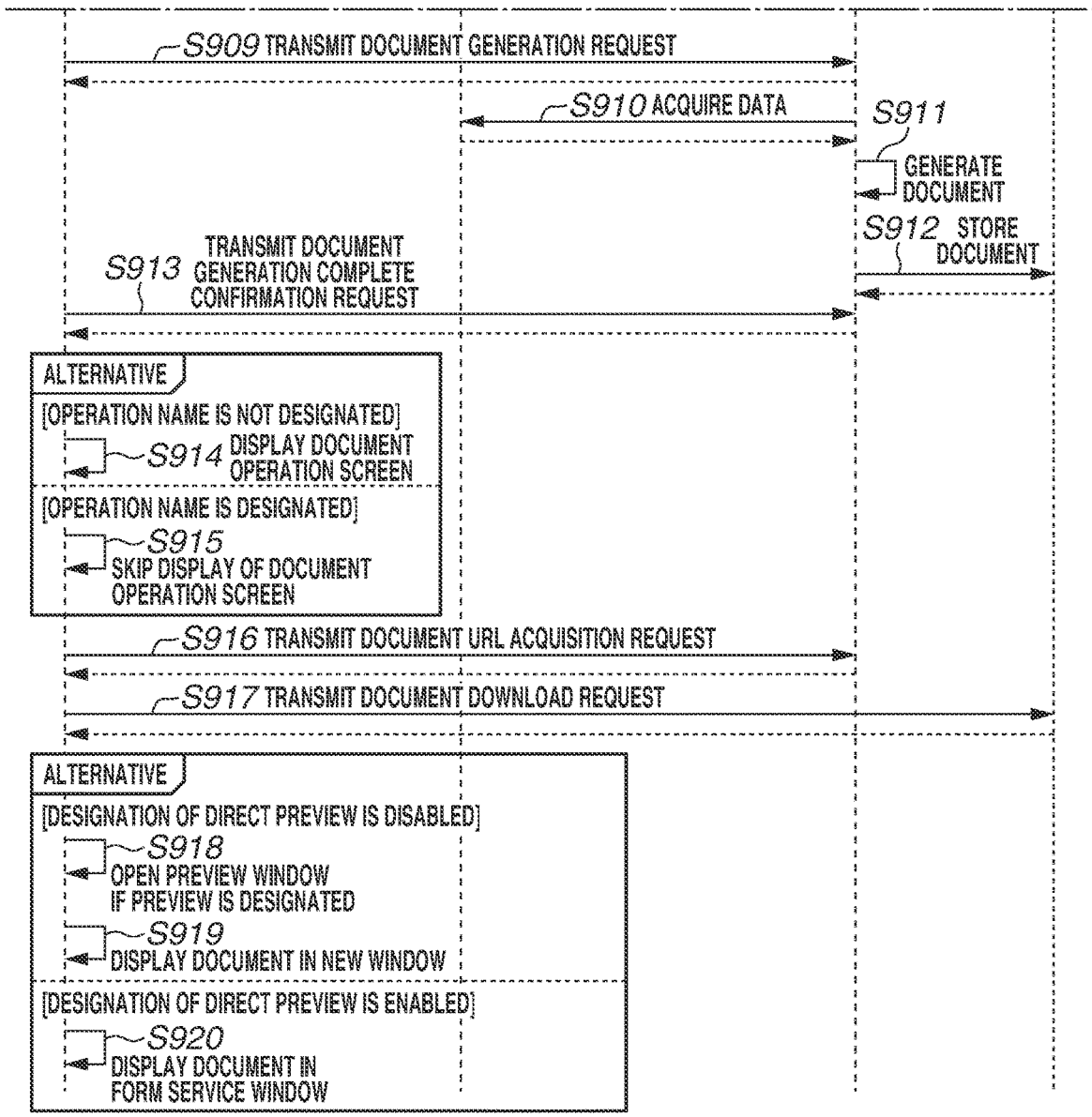

FIG. 8 is a sequence diagram illustrating document data generation processing and document display processing in the web browser 301. Assume herein that the user is already logged in to the cloud platform server 102 on a login screen (not illustrated). In step S901, when the user presses the document generation request button 401 on the work screen 400 displayed on the web browser 301 of the client terminal 101, the web server 302 determines whether the form ID 506 and the preview operation in the operation name 507 are designated in a document generation request button setting 501. If the form ID 506 and the operation name 507 are not designated in the document generation request button setting 501, redirect URL creation processing is performed in step S903.

In step S903, the web server 302 acquires the document generation server URI 504, the CPS URL 505, the form ID 506, the operation name 507, the attach destination ID 508, the form selection keyword 509, the query variable 510, the document name 511, and the direct preview 512, which are set in the document generation request button 401. Further, the redirect URL is generated from the acquired parameters, and a response for redirecting the web browser 301 is returned to the web browser 301. If the form ID 506 and the preview operation in the operation name 507 are designated in the document generation request button setting 501, a parameter for enabling the direct preview 512 is added to the redirect URL in the redirect URL creation processing in step S902.

In step S904, the web browser 301 is redirected to the document generation server 103 in accordance with the received redirect URL. The parameter for the direct preview 512 is not enabled unless both the form ID 506 and the preview operation in the operation name 507 are designated. However, the parameter may be enabled also when only the preview operation is designated in the operation name 507. This is because there is a possibility that the operation may be re-selected if the form selection is carried out again in the case of checking the preview in a state where the preview operation is designated in advance. On the contrary, if the form selection is not carried out, priority is given to the usability assuming that no operation is to be performed. In this case, only the form service window is used, which leads to an improvement in the operability and visibility of the web browser 301.

In step S905, when the web server 306 receives a redirect from the web browser 301, the form selection screen 420, the document operation screen 430, and the user interface information including a document generation script are transmitted to the client terminal 101. At this time, the web server 306 acquires a list of form information from the form management unit 310, incorporates the list of form information into the user interface information, and transmits the user interface information to the client terminal 101. The web browser 301 of the client terminal 101 determines whether the form ID 506 is designated in the redirect URL. If the form ID 506 is not designated, in step S906, the web browser 301 which has received the user interface information displays the form selection screen 420 in a state where a form name selected from the acquired list of form information is displayed in the form selection 421.

If the form ID 506 is designated, it is considered that the form to be used for generating a document is already determined (S907), and the form selection screen 420 is displayed and then the processing proceeds to determination processing in step S908 prior to the reception of a user operation. The term "skip display" illustrated in the drawings indicates that a screen is displayed once and designation processing is started without receiving a user operation because the operation is already designated, although the processing is supposed to proceed after the designation of the user operation is received. FIG. 7 is based on the premise that a screen is displayed. For example, in step S808, the document operation screen 430 is displayed regardless of the designation in a URL. However, the screen need not necessarily be displayed, and the processing may proceed by skipping the display processing.

If the preview operation is designated in the operation name 507 in the redirect URL and the designation of the direct preview 512 is disabled, the web browser 301 creates an empty pop-up window for preview in step S908. Step S908 is an option and is processing in which the direct preview 512 is not enabled unless both the form ID 506 and the operation name 507 are designated as described above. If the form ID 506 is designated in the redirect URL, the web browser 301 waits for the user to perform selection processing in the form selection 421 and press the document generation button 422 to determine a form to be used. After the form is determined, the processing proceeds to step S908.

In step S909, the document generation request is transmitted to the web server 306 together with the form ID selected in the form selection 421 or the form ID 506. When the web server 306 receives the document generation request in step S909, the document generation unit 308 sends a data acquisition request to the cloud platform server 102 by using the query command 605 that matches the designated form in step S910. In this case, the CPS URL 505 is used as the URL for the cloud platform server 102.

When work data is acquired in step S910, in step S911, the document generation unit 308 of the document generation server 103 acquires a form file from the form management unit 310, and generates a document. Next, in step S912, the document management unit 309 transmits a document storage request to the storage server 104, and stores the document generated in step S911. The web server 312 of the storage server 104 which has received the document storage request causes the access control unit 313 to check whether the request is valid. If the request is valid, the document is stored in the storage management unit 314. In step S913, the web browser 301 transmits a document generation complete confirmation request to the web server 306 of the document generation server 103.

The web server 306 which has received the document generation complete confirmation request acquires a document generation processing state from the document generation unit 308, and returns the document generation processing state to the web browser 301. If the document generation processing is being executed, the web browser 301 which has received the document generation processing state repeats the processing of step S913. If the document generation processing and the document storage processing are completed, the web browser 301 determines the redirect URL. If the operation name 507 is not included in the redirect URL, in step S914, the web browser 301 displays the document operation screen 430 and waits for the user to press the document operation button 431. If the operation name 507 is included in the redirect URL, in step S915, it is considered that the operation to be performed on the document is already determined. Then, after the document operation screen is displayed, the subsequent step is executed immediately before a user operation is received. A case where the preview operation is designated as the operation using the document operation button 431 will be described below.

In step S916, the web browser 301 transmits the document URL acquisition request to the web server 306 of the document generation server 103. If the document generation processing and document storage processing to store a document in the storage server 104 are completed, the document management unit 309 which has received the request issues a temporary URL in the storage server 104 to acquire the document, and the web server 306 returns the temporary URL to the web browser 301.

In step S917, the web browser 301 accesses the temporary URL returned in step S916, thereby transmitting a document download request to the storage server 104. The web server 312 of the storage server 104 which has received the document download request causes the access control unit 313 to check whether the request is valid. If the request is valid, the storage management unit 314 returns the document file. After completion of the reception of the document file in step S917, the web browser 301 determines the redirect URL.

If the designation of the direct preview 512 is disabled in the redirect URL, in step S918, it is determined whether the preview operation is designated in the operation name 507 in the redirect URL. If the preview operation is designated, since the preview window is not opened yet, the web browser 301 opens a new window, i.e., a pop-up window in the first exemplary embodiment, to thereby display the document file in step S919. If the direct preview 512 is included in the redirect URL, in step S920, the web browser 301 displays the document file in the window of the document operation screen 430. By the processing sequence described above, the document generation server 103 executes the document generation processing.

FIG. 9 is a flowchart illustrating redirect URL creation processing in the cloud platform server 102. In step S1001, the web server 302 of the cloud platform server 102 performs processing to load the parameters 502 to 512 in the document generation request button setting 501. In step S1002, the web server 302 determines whether the preview operation is designated in the operation name 507 and the form ID 506 is present. If the preview operation is designated in the operation name 507 and the form ID 506 is present (YES in step S1002), the processing proceeds to step S1003. In step S1003, the direct preview 512 is added as a parameter.

In step S1004, the web server 302 generates a redirect URL based on the document generation server URI 504, the CPS URL 505, the form ID 506, the operation name 507, the attach destination ID 508, the form selection keyword 509, the query variable 510, the document name 511, and the direct preview 512, which are set in the document generation request button 401. In step S1006, the web server 302 transmits a redirect response to the web browser 301.

As described above, in the case of previewing a document, by skipping a user operation on the screen of the document generation server 103, in the browsing screen on the web browser for displaying form document data, the browsing screen is opened in a window of an operation selection screen, thereby making it possible to disable the selection of an operation other than the designated document operation. Further, in the case of previewing a document without skipping the user operation, an operation can be re-selected in the remaining window of the operation selection screen after checking the document on the browsing screen opened in a pop-up window.

In the first exemplary embodiment, if the preview operation and the form ID are designated in the document generation request button 401, the direct preview 512 is added as a parameter and the preview screen is opened in the window of the operation selection screen. The document generation server 103 includes a function for designating two operations. Examples of the operations that can be designated by the document generation server 103 include an "attach" operation, in addition to the preview operation. The attach operation is an operation of storing the generated document in the cloud platform server 102. A storage location is designated using the attach destination ID 508 of the document generation request button setting 501. On an attach operation complete screen to be displayed after completion of attach processing, an attach destination URL is displayed, which enables the user to access the attach destination URL to acquire the stored document.

However, if the attach operation and the preview operation are set as the operation in the document generation request button 401 and the form ID is also set, the screen transitions to the preview screen without waiting for a user operation after completion of the attach processing, so that the attach processing result cannot be checked. In a second exemplary embodiment of the present disclosure, the attach processing result can be previewed after checking the attach processing result on the display of the form browsing screen. Descriptions of components and processing that are similar to those in the first exemplary embodiment are omitted in the second exemplary embodiment.

Figure 10:
FIG. 10 includes
Figure 10A:
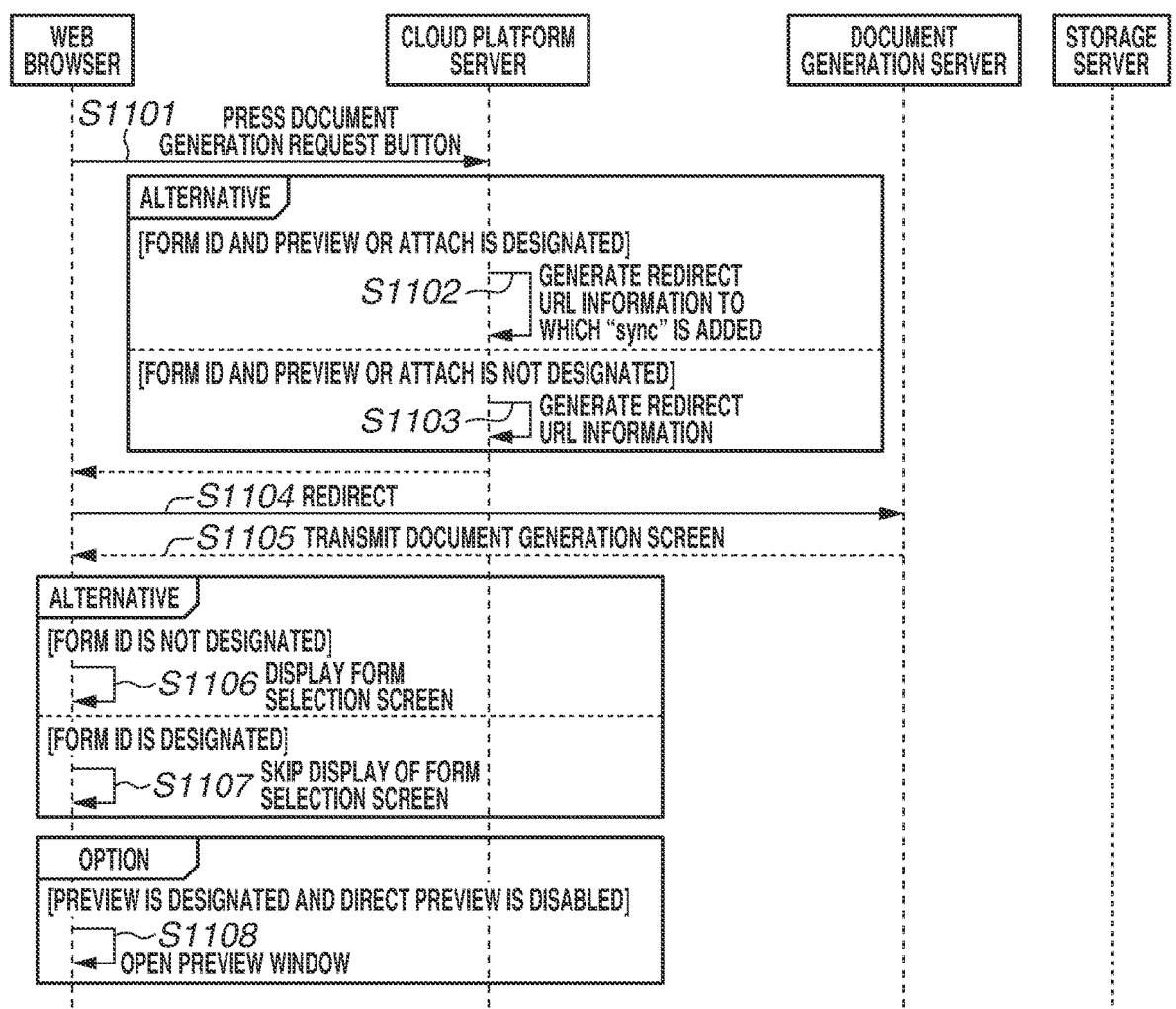
FIGS. 10A and 10B are sequence diagrams illustrating processing to be executed by a document generation server according to a second exemplary embodiment.
Figure 10B:
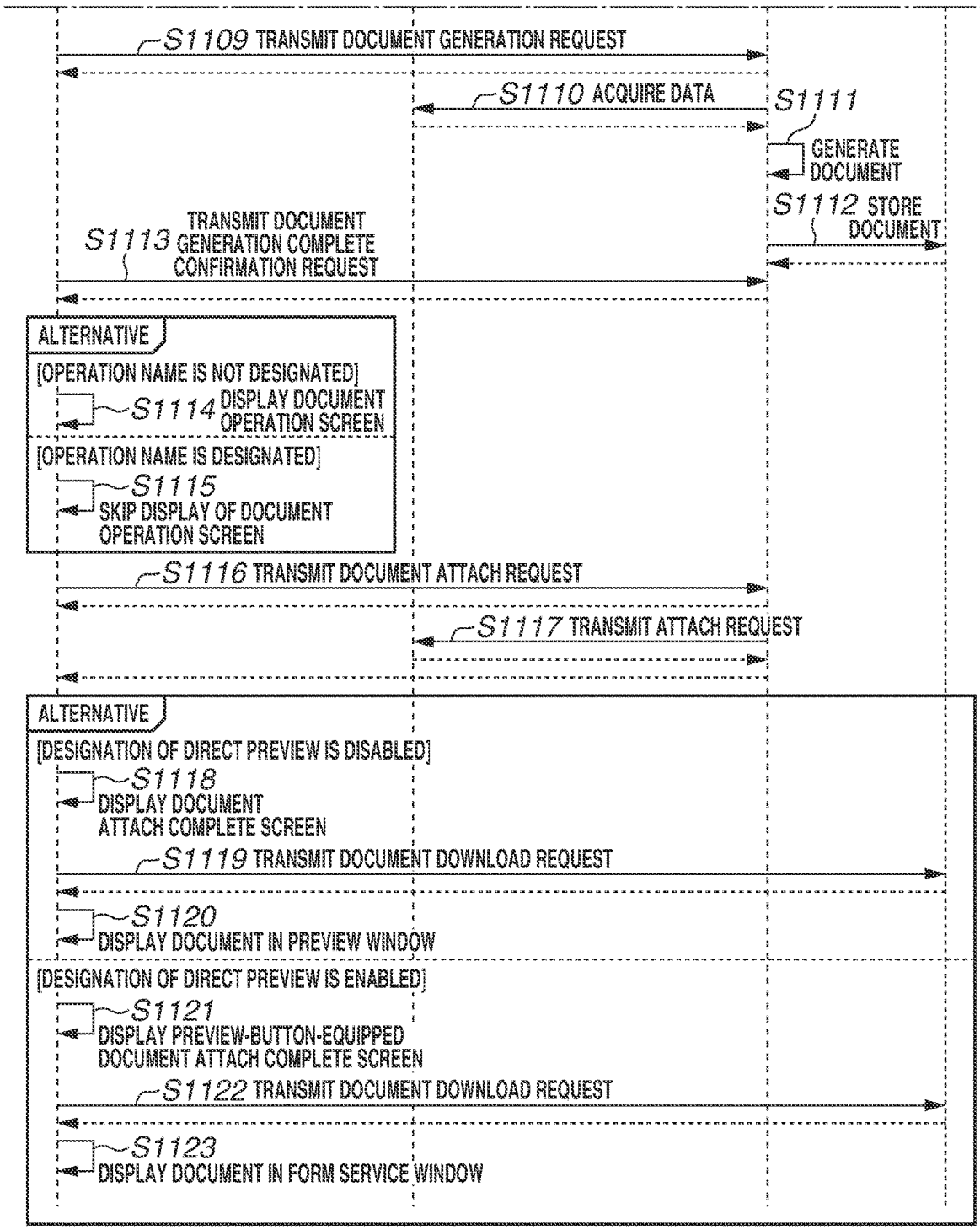

FIG. 10 is a sequence diagram illustrating processing to be executed by the document generation server 103 according to the second exemplary embodiment. Steps S1101 to S1115 are identical to steps S901 to S915 illustrated in FIG.

8, and thus descriptions thereof are omitted. In the first exemplary embodiment, the designation of the preview operation is set as a condition for enabling the direct preview 512, while in the second exemplary embodiment, the attach operation is also set as a condition for enabling the direct preview 512. The second exemplary embodiment is similar to the first exemplary embodiment in that the designation of a form ID is not necessarily set as a condition for enabling the direct preview 512. A case where the form ID 506 and a character string "attachpreview" for designating both the attach operation and the preview operation are designated in the operation name 507 in the document generation request button setting 501 will be described below.

In step S1116, the web browser 301 transmits a document attach request to the web server 306 of the document generation server 103. If the document generation processing and the document storage processing to store a document in the storage server 104 are completed, the document management unit 309 which has received a request transmits an attach request to the cloud platform server 102. In step S1117, the document management unit 309 creates the attach request based on the attach destination ID 508 and the CPS URL 505 which are designated in the document attach request, transmits the attach request together with the document acquired from the storage server 104, to the cloud platform server 102, and returns the attach processing result to the web browser 301.

The web browser 301 which has received the document attach request result determines the redirect URL. If the designation of the direct preview 512 in the redirect URL is disabled, in step S1118, the web browser 301 displays an attach complete screen. After the attach complete screen is displayed, in step S1119, the web browser 301 accesses the temporary URL returned in step S1116, thereby transmitting the document download request to the storage server 104. In step S1120, the web browser 301 displays the received document in the preview window created in step S1108.

If the designation of the direct preview 512 is enabled in the redirect URL, in step S1121, the web browser 301 displays a preview-button-equipped attach complete screen 1407 to be described below. When the user presses a preview button, in step S1119, the web browser 301 accesses the temporary URL returned in step S1116, thereby transmitting the document download request to the storage server 104 (S1122). In step S1123, the web browser 301 displays the document file in the window of the document operation screen 430. By the processing sequence described above, the document generation server 103 executes the document generation processing.

FIGS. 11A to 11E and FIG. 13 illustrate screen examples of the cloud platform server 102 and the document generation server 103. The work screen 400, the form selection screen 420, the document operation screen 430, and the preview screen 440 are identical to those described above and steps S1401 to S1405 are identical to steps S451 to S455, and thus descriptions thereof are omitted. A case where the form ID 506 is designated and the attach operation and the preview operation are designated in the operation name 507 in the document generation request button setting 501 will be described below.

If the attach operation and the preview operation are selected in the operation name 407 of the redirect URL, the web browser 301 performs the following processing. That is, the web browser 301 transmits a document data attach request to the document generation server 103 to acquire the document data URL and the attach processing result in the storage server 104 storing the document data.

Further, if the direct preview 512 is designated in the redirect URL, the web browser 301 displays the preview-button-equipped attach complete screen 1407 including a preview button 1408 for transmitting the document data acquisition request. In this case, when the user presses the preview button 1408, the preview screen is displayed in the form service window. In step S1409, when the user presses the preview button to issue an instruction, the web browser 301 displays the preview screen 440 in the window of the attach complete screen 1407 without creating a pop-up window. If the direct preview 512 is not designated in the redirect URL, an attach complete screen 1412 including no preview button is displayed. Then, immediately after completion of the display, the preview screen 440 is displayed in the preview window (S1411).

As described above, when both the preview operation and the attach operation for a document are designated by skipping a user operation on the screen of the document generation server 103 in the browsing screen on the web browser for the form document data, the preview-button-equipped attach complete screen 1407 is displayed, thereby enabling the user to preview the document after checking the attach processing result. In this case, the preview window is opened in the window of the preview-button-equipped attach complete screen 1407 because the operation cannot be re-selected after the preview operation.

Figure 12:
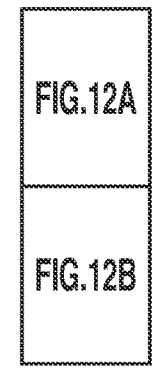
FIG. 12 includes
Figure 12A:
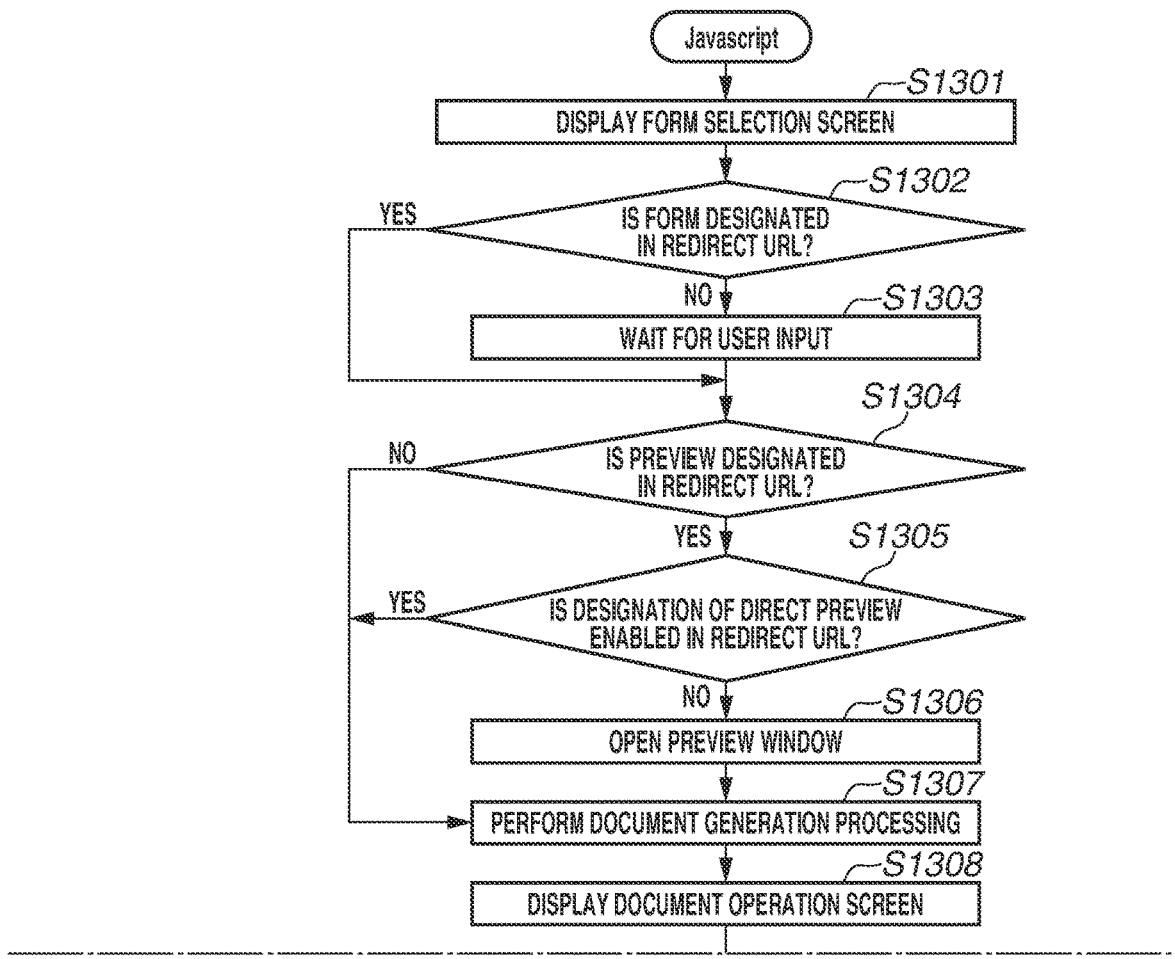
FIGS. 12A and 12B are flowcharts illustrating document generation processing and document display processing in the web server 302 according to the second exemplary embodiment.
Figure 12B:
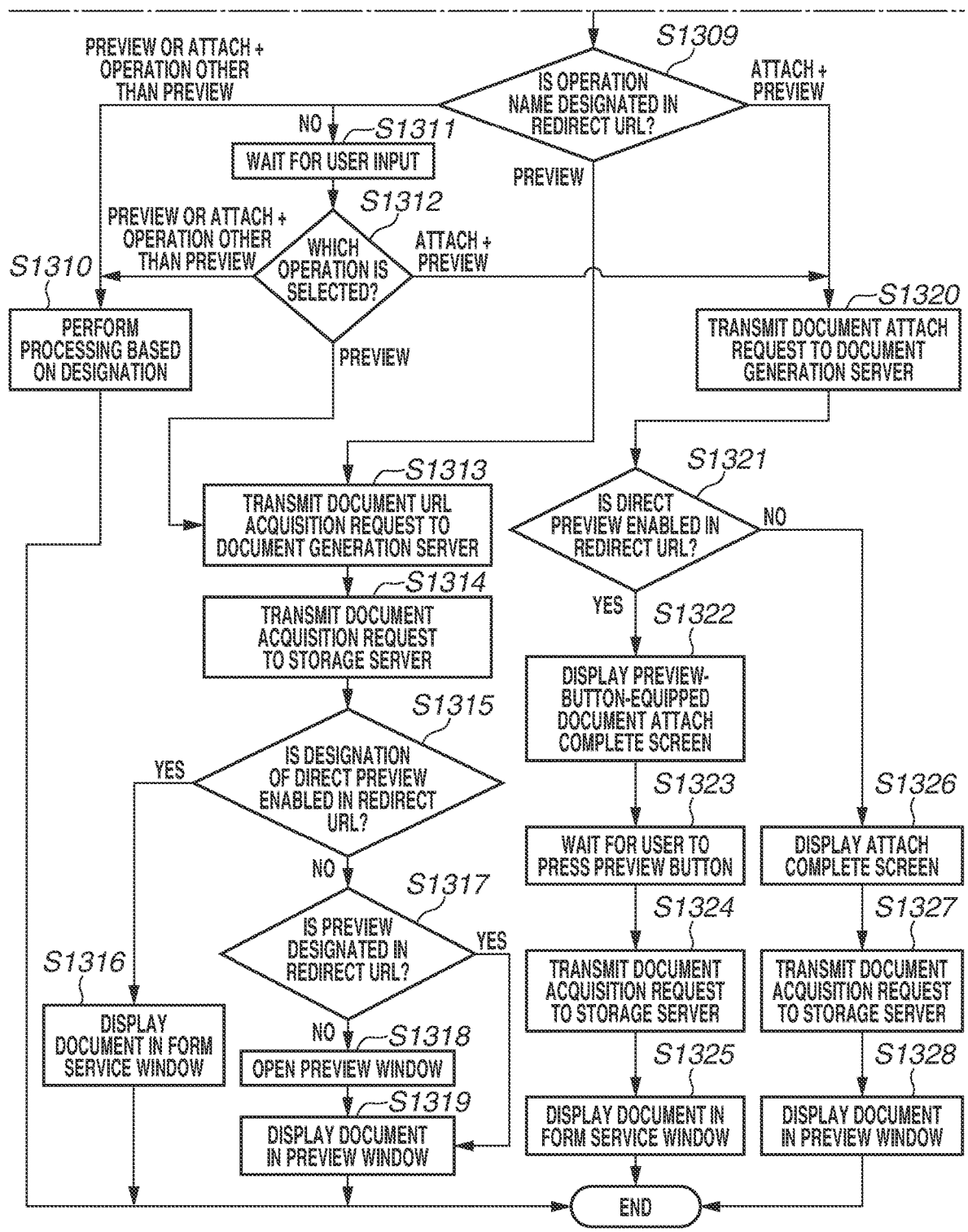
Figure 13:
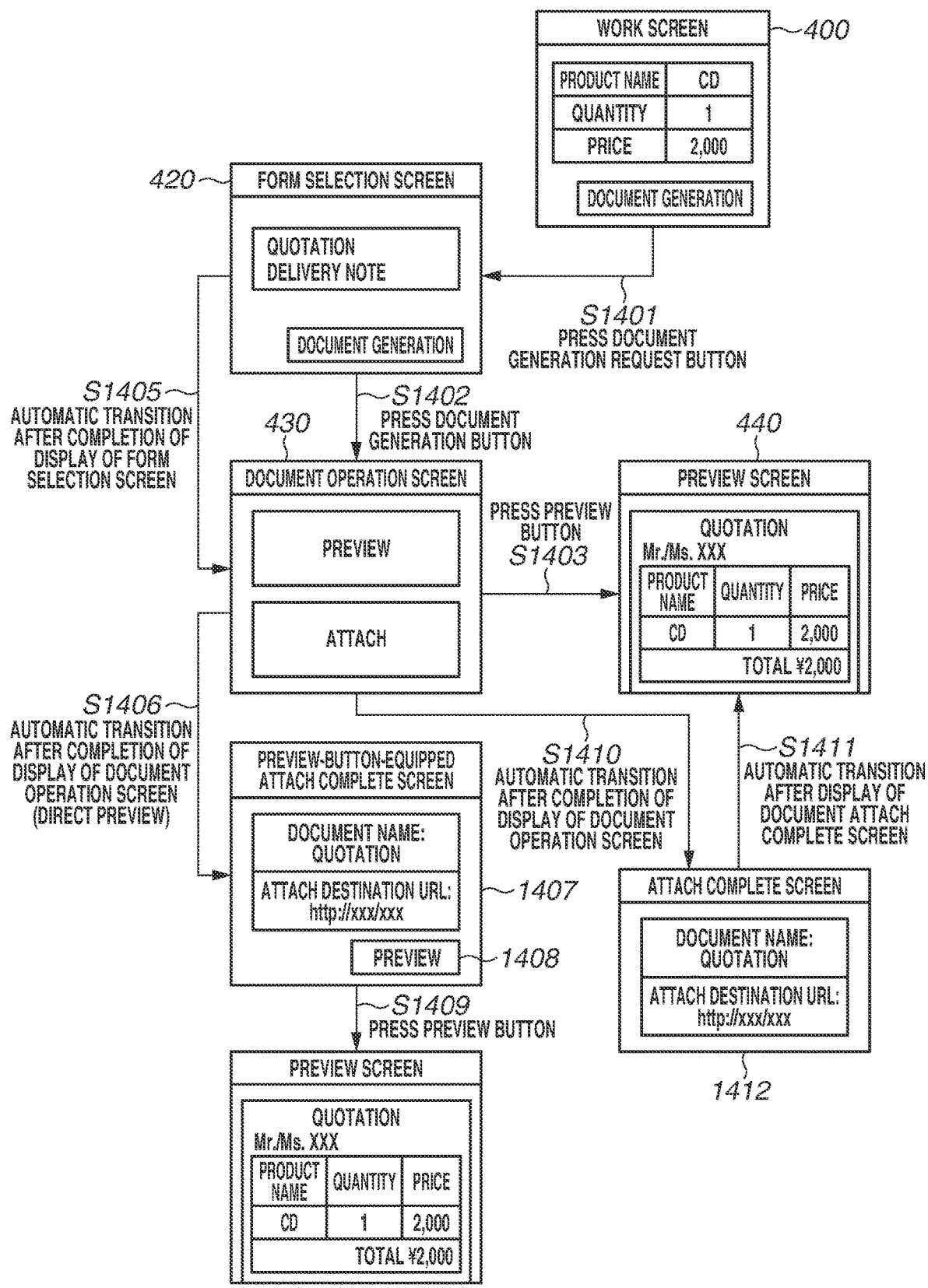
FIG. 13 illustrates a screen transition flow in the cloud platform server and the document generation server according to the second exemplary embodiment.

FIG. 12 is a flowchart illustrating document generation processing and document display processing in the web server 302. Steps S1301 to S1308 are similar to steps S801 to S808 illustrated in FIG. 7, and steps S1313 to S1319 are similar to steps S813 to S1319, and thus descriptions thereof are omitted. In step S1309, the web browser 301 determines whether the operation name 507 is designated in the redirect URL. If the preview operation and attach plus an operation other than preview are designated, the processing proceeds to step S1310. In step S1310, processing based on the designated operation is performed. If the preview operation is designated, steps S1313 to S1319, which are similar to steps S813 to S819, respectively, are carried out, and thus descriptions thereof are omitted.

If the attach operation and the preview operation are designated, the processing proceeds to step S1320. In step S1320, the document attach request is transmitted to the document generation server 103 to acquire the attach processing result and the document URL. Next, in step 1321, the web browser 301 determines whether the designation of the direct preview 512 is enabled in the redirect URL. If the designation of the direct preview 512 is enabled (YES in step S1321), the processing proceeds to step S1322. In step S1322, the preview-button-equipped attach complete screen 1407 is displayed.

In step S1323, the web browser 301 waits for the user to press the preview button 1408. In step S1324, the web browser 301 transmits the document URL acquisition request to the document generation server 103. Details of the processing are the same as those described above, and thus descriptions thereof are omitted. In step S1325, the web browser 301 displays the acquired document as a document file in the window of the attach complete screen 1407.

If the designation of the direct preview 512 is not enabled (NO in step S1321), the processing proceeds to step S1326. In step S1326, the attach complete screen 1412 is displayed. In step S1327, the web browser 301 transmits the document URL acquisition request to the document generation server 103. Details of the processing are the same as those described above, and thus descriptions thereof are omitted. In step S1328, the web browser 301 displays the acquired document as a document file in the preview window created in step S1306. By the processing described above, the web browser 301 executes the document generation processing and the document display processing.

According to the second exemplary embodiment, in a case where the attach operation and the preview operation are designated in the redirect URL and a screen is displayed by skipping the document operation, the attach complete screen is displayed in the form service window, thereby enabling designation of the preview operation on the screen and checking of the preview, while preventing display of each window of the web browser 301.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-035318, filed Feb. 28, 2018, which is hereby incorporated by reference herein in its entirety.

What is claimed is:

1. An information processing apparatus comprising:
a memory;
a processor coupled to the memory which performs one or more programs stored on the memory such that the processor operates to:
communicate using a web browser with a system including a cloud platform server, a document generation server, and a storage server;
wherein the web browser is configured to display a screen based on data transmitted from the system to display a first window, a second window, and a third window, the first window being configured to display a work screen to receive an instruction to generate a document, the second window being configured to display a document operation screen to receive an instruction to perform an operation on the document generated in response to the instruction to generate the document, the third window being configured to display the document to be previewed in response to the instruction to perform the operation; and
wherein, in a case where preview is designated in a parameter as document operation name in HyperText Markup Language (HTML) on the work screen, the screen displays the document in the second window without opening the third window.

2. The information processing apparatus according to claim 1, wherein the work screen is a screen provided by the cloud platform server, and in a case where a preview operation is set as a parameter in setting information about a document generation request button included in the work screen, a redirect uniform resource locator (URL) to the document generation server in which direct preview is enabled is generated by pressing of the document generation request button, and the processor causes the web browser to access the document generation server based on the redirect URL, skips display of the document operation screen, and displays the document in the second window.

3. The information processing apparatus according to claim 2, wherein, in a case where a document operation name including the preview operation is not set as a parameter in the setting information about the document generation request button included in the work screen, a redirect URL to the document generation server in which direct preview is disabled is generated by pressing of the document generation request button, and the processor causes the web browser to access the document generation server based on the redirect URL, opens the third window, and displays the document in the third window.

4. The information processing apparatus according to claim 2, wherein, in a case where the preview operation is set as a parameter in the setting information about the document generation request button included in the work screen and a form ID used to generate the document is also set as a parameter, a redirect URL to the document generation server in which direct preview is enabled is generated by pressing of the document generation request button, and the processor causes the web browser to access the document generation server based on the redirect URL, skips display of the document operation screen, and displays the document in the second window.

5. The information processing apparatus according to claim 2, wherein, in a case where the preview operation is set as a parameter in the setting information about the document generation request button included in the work screen but a form ID used to generate the document is not set as a parameter, a redirect URL to the document generation server in which direct preview is disabled is generated by pressing of the document generation request button, and the processor causes the web browser to access the document generation server based on the redirect URL, opens the third window, and displays the document in the third window.

6. The information processing apparatus according to claim 2, wherein, in a case where the document is transmitted to the cloud platform server as a parameter in the setting information about the document generation request button included in the work screen and an attach operation to preview the document is set, a redirect URL to the document generation server in which direct preview is enabled is generated by pressing of the document generation request button, and the processor causes the web browser to access the document generation server based on the redirect URL, skips display of the document operation screen, displays, in the second window, a complete screen indicating that transmission of the document is completed, and further displays, in the second window, the document in response to a preview instruction from the complete screen.

7. The information processing apparatus according to claim 6, wherein, in a case where a document operation name including an attach operation is not set as a parameter in the setting information about the document generation request button included in the work screen, a redirect URL to the document generation server in which direct preview is disabled is generated by pressing of the document generation request button, and the processor causes the web browser to access the document generation server based on the redirect URL, opens the third window, displays, in the third window, the complete screen indicating that transmission of the document is completed, and automatically displays the document in the third window.

8. The information processing apparatus according to claim 2, wherein skipping of the display indicates that the system is accessed to display a subsequent screen without receiving an operation from a user after the document operation screen is displayed.

9. A method to be executed by an information processing apparatus including a web browser configured to communicate with a system including a cloud platform server, a document generation server, and a storage server, the method comprising:

displaying, by the web browser configured to display a screen based on data transmitted from the system, a first window, a second window, and a third window, the first window being configured to display a work screen to receive an instruction to generate a document, the second window being configured to display a document operation screen to receive an instruction to perform an operation on the document generated in response to the instruction to generate the document, the third window being configured to display the document to be previewed in response to the instruction to perform the operation;

wherein, in a case where preview is designated in a parameter as a document operation name in HTML on the work screen, the document is displayed in the second window without opening the third window.

10. A non-transitory computer-readable storage medium storing a program for causing a computer to execute a method for a web browser to be executed by an information processing apparatus including the web browser configured to communicate with a system including a cloud platform server, a document generation server, and a storage server, the method comprising:

displaying, by the web browser configured to display a screen based on data transmitted from the system, a first window, a second window, and a third window, the first window being configured to display a work screen to receive an instruction to generate a document, the second window being configured to display a document operation screen to receive an instruction to perform an operation on the document generated in response to the instruction to generate the document, the third window being configured to display the document to be previewed in response to the instruction to perform the operation;

wherein, in a case where preview is designated in a parameter as a document operation name in HTML on the work screen, the document is displayed in the second window without opening the third window.

* * * * *